US009658330B2

(12) United States Patent
Doherty (10) Patent No.: US 9,658,330 B2
(45) Date of Patent: May 23, 2017

(54) SYSTEMS AND METHODS FOR IDENTIFYING AND LOCATING TARGET OBJECTS BASED ON ECHO SIGNATURE CHARACTERISTICS

(71) Applicant: Joshua R. Doherty, Seattle, WA (US)

(72) Inventor: Joshua R. Doherty, Seattle, WA (US)

(*) Notice: Subject to any disclaimer, the term of this patent is extended or adjusted under 35 U.S.C. 154(b) by 265 days.

(21) Appl. No.: 14/452,559

(22) Filed: Aug. 6, 2014

(65) Prior Publication Data

US 2015/0192672 A1    Jul. 9, 2015

Related U.S. Application Data

(60) Provisional application No. 61/863,564, filed on Aug. 8, 2013.

(51) Int. Cl.
| | |
|---|---|
| *G01S 15/06* | (2006.01) |
| *G01S 7/521* | (2006.01) |
| *G01S 7/539* | (2006.01) |
| *G01S 7/54* | (2006.01) |
| *G01S 15/96* | (2006.01) |
| *G01S 7/52* | (2006.01) |

(52) U.S. Cl.
CPC ............. *G01S 15/06* (2013.01); *G01S 7/521* (2013.01); *G01S 7/539* (2013.01); *G01S 7/54* (2013.01); *G01S 7/52004* (2013.01); *G01S 15/96* (2013.01)

(58) Field of Classification Search
CPC ........ G10K 11/205; H03H 9/175; G01S 7/54; G01S 7/539; G01S 15/06; G01S 15/96
See application file for complete search history.

(56) References Cited

U.S. PATENT DOCUMENTS

| | | | |
|---|---|---|---|
| 3,253,337 A | 5/1966 | Ebert | |
| 4,312,053 A | 1/1982 | Lipsky | |
| 5,563,849 A | 10/1996 | Hall et al. | |
| 7,307,537 B2 | 12/2007 | Brungot et al. | |
| 7,307,914 B1 | 12/2007 | Carter | |
| 7,447,116 B2 | 11/2008 | Bratcher | |
| 8,009,516 B2 | 8/2011 | Crowell | |
| 8,387,303 B2 | 3/2013 | Abraham et al. | |
| 2012/0188844 A1* | 7/2012 | Tiltman | B29C 39/003 367/2 |

OTHER PUBLICATIONS

Anstee,"Use of Spherical Objects as Calibrated Minehunting Sonar Targets", Maritime Operations Division Systems Sciences Laboratory, http://dspace.dsto.defence.gov.au/dspace/bitstream/1947/3741/1/DSTO-TN-0425%20PR.pdf, Dec. 2002, p. 1-24.*

* cited by examiner

*Primary Examiner* — Luke Ratcliffe
*Assistant Examiner* — Hovhannes Baghdasaryan
(74) *Attorney, Agent, or Firm* — Olive Law Group, PLLC (57) ABSTRACT

Systems and methods for identifying and locating target objects based on echo signature characteristics are disclosed. According to an aspect, a system includes a transmitter configured to transmit one or more mechanical waves to a target object for echo of the one or more mechanical waves by the target at a predetermined signature characteristic. The system also includes a detector configured to detect the echo. Further, the system includes a computing device configured to identify the predetermined signature characteristic of the detected echo for locating the target object.

4 Claims, 7 Drawing Sheets

SYSTEMS AND METHODS FOR IDENTIFYING AND LOCATING TARGET OBJECTS BASED ON ECHO SIGNATURE CHARACTERISTICS

CROSS REFERENCE TO RELATED APPLICATION

This application claims the benefit of and priority to U.S. Provisional Patent Application No. 61/863,564, filed Aug. 8, 2013, and titled UNDERWATER TARGET WITH A UNIQUELY DESIGNED ACOUSTIC SIGNATURE AND METHODS OF USE; the disclosure of which is incorporated herein by reference in its entirety.

TECHNICAL FIELD

The presently disclosed subject matter relates to object location and identification systems. More particularly, the present disclosure relates to system and methods for identifying and locating target objects based on echo signature characteristics.

BACKGROUND

The need to determine the location of underwater objects or objects within other surrounding media has long existed. Military and defense applications use underwater surveillance to detect enemies, torpedoes, and mines or explosives. Diving crews rely on accurate depth measurements of divers below the water surface to ensure their safety. Commercial and recreational fishermen are more generally successful if they know the depth of the fish in lakes and oceans. Biologists and other scientists track the migratory and behavior patterns of fish and other forms of aquatic life.

In World War I and World War II, sonar (originally an acronym for SOund Navigation And Ranging) technologies were developed to detect acoustic echoes from underwater objects, for example, to identify enemy submarines. Since then, a tremendous amount of research and development of sonar technologies and underwater acoustics has occurred. Today, sonar remains vital to many industries and, in fact, is taking on an ever more important role as more sophisticated warfare technologies emerge.

Sonar is a technique that uses sound propagation to navigate, communicate with or detect objects on or under the surface of the water or a surrounding medium, such as other vessels. Two types of technology share the name "sonar," passive sonar and active sonar. Passive sonar is essentially listening for the sound made by vessels or objects, whereas, active sonar includes emitting pulses of sounds and listening for echoes. Sonar may be used as a means of acoustic location and of measurement of the echo characteristics of "targets" in the water or a surrounding medium. A target's material composition, orientation, and geometry are all factors affecting the frequency of the reflected acoustic sound. Additionally, the underwater environment consists of numerous acoustic noise sources that combine with the target's echoes, further making the unique identification of a target echo challenging. Reverberation of echoes off the floor, scattering of acoustic signals by sources other than the target, and acoustic signals generated by ships and aquatic life contaminate and inevitably degrade the signal quality of a target's echo or reflected acoustic signal. Additionally, because it depends upon properties including a target's geometry and material composition, the pulses of sounds emitted and/or reflected by the target are therefore difficult to predict.

In view of the foregoing, there is a need for improved systems and methods for identifying and locating objects within a surrounding medium.

SUMMARY

Disclosed herein are systems and methods for identifying and locating target objects based on echo signature characteristics. According to an aspect, a system includes a transmitter configured to transmit one or more mechanical waves to a target object for echo of the one or more mechanical waves by the target at a predetermined signature characteristic. The system also includes a detector configured to detect the echo. Further, the system includes a computing device configured to identify the predetermined signature characteristic of the detected echo for locating the target object.

According to another aspect, a target object includes a housing defining an interior. The housing is configured to insulate the interior from pressure changes external to the housing. Further, the housing is configured with an acoustic impedance for being substantially equal to a medium external to the housing. The target object includes an agent positioned within the interior. The agent is configured to receive one or more mechanical waves. Further, the agent is configured to generate an echo of the one or more mechanical waves in response to receipt of the mechanical wave(s).

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a processing circuit for the image optimization using a mobile computing device. In another example, a computing device may be a server or other computer located within a commercial, residential or outdoor environment and communicatively connected to other computing devices for the image optimization using a mobile computing device. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "transmitter" may be a device configured to generate and transmit one or more mechanical waves into a medium. For example, a transmitter may be configured to transmit sound waves of one or more frequencies into water. A mechanical wave or pulse may be generated electronically by use of a sonar projector, for example, having a signal generator, a power amplifier, and an electro-acoustic transducer/array. The transmitter may be configured to transmit the mechanical wave such that an echo (or reflection) of the mechanical wave is produced by an object when the mechanical wave reaches the object.

As referred to herein, the term "receiver" may a device configured to receive an echo of a mechanical wave generated by a transmitter. Further, the receiver may generate and output an electrical signal to a computing device. The computer device may be suitably configured to receive the electrical signal, to analyze the electrical signal, to identify a target object, and to locate the target object in accordance with embodiments of the present disclosure.

As referred to herein, the term "locating" may refer to the act of identifying or discovering the place or position of one or more objects. The position may be identified by a depth of the object(s) with a medium, 3D positioning coordinates, bearing, range, and the like.

Figure 1:
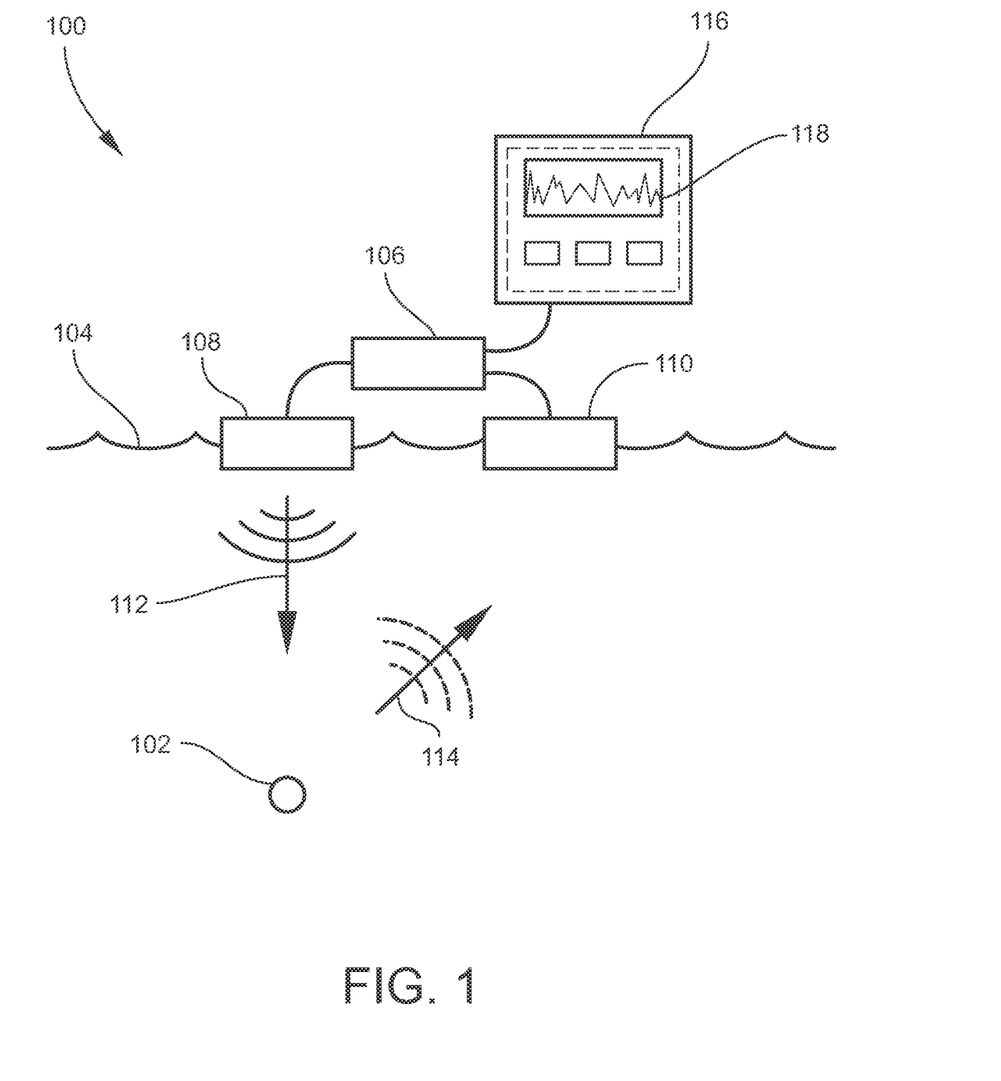
FIG. 1 illustrates a block diagram of an example system configured to identify and locate a target object within a surrounding medium in accordance with embodiments of the present disclosure.

FIG. 1 illustrates a block diagram of an example system 100 configured to identify and locate a target object 102 within a surrounding medium 104 in accordance with embodiments of the present disclosure. Referring to FIG. 1, the system 100 may include a computing device 106, a transmitter 108, and a receiver 110 for the identification of the target object 102. In this example, the system 100 is an active sonar system. The system 100 can emit pulses of acoustic sounds or mechanical waves, and listen for echoes of the mechanical waves. The system 100 may be a monostatic, a bistatic or a multistatic type system. If the transmitter 108 and the receiver 110 are co-located with each other the system 100 is known as a monostatic system. If the transmitter 108 and the receiver 110 are separated, the system 100 is a bistatic system.

In another example, multiple transmitters and/or multiple receivers may be utilized. In this example, the transmitters may be spatially separated. The receivers may also be spatially separated. Such a configuration may be referred to as a multistatic system.

The transmitter 108 may be configured to transmit on or more mechanical waves 112 of one or multiple different frequencies into a medium 104, such as water. For example, the transmitter 108 may generate and transmit a pulse of acoustic sound into water. The pulse of acoustic sound 112 may be transmitted at a predetermined frequency as appropriate for the surrounding medium 104. For example, operation of the system 100 is affected by variations in acoustic sound speed and attenuation of the acoustic waves. Acoustic sound travels more slowly in fresh water than in sea water, though the difference may be small. The speed may be determined by several factors including temperature, dissolved impurities (e.g., salinity), and pressure. Attenuation of the acoustic wave increases with frequency and distance traveled by the acoustic wave. The frequency and signal strength used may be determined based on these factors, including the surrounding medium 104 type, the anticipated distance of the target object 102 from the sonar system 100, the transmitter 108 or the receiver 110. The transmitted mechanical waves 112 may be generally or specifically directed by the transmitter 108 as appropriate within the surrounding medium 104. The transmitted mechanical waves 112 may also be different signal types (e.g., pulses, continuous waves, etc.).

The receiver 110 may be configured to receive an echo or reflected mechanical wave or waves (or reflected acoustic sound) 114 of the transmitted mechanical waves 112. The echo 114 may be produced by the target object 102 or other objects also located in the surrounding medium 104. The reflected acoustic sound 114 may be reflected at a resonant frequency specific to the acoustic target 102, which may be used for identification of the acoustic target 102. The echo 114 may also be reflected by other surrounding objects, such as a lake bottom, aquatic life forms, rock formations, and temperature inversions in the surrounding medium 104, as examples. Differentiating between the echo 114 reflected by the target object 102 as compared to echo(s) or other reflected acoustic sounds from the other surrounding objects such as a lake bottom, aquatic life forms, rock formations and/or temperature inversions can be performed by the computing device 106 as described herein.

With continued reference to FIG. 1, the computing device 106 may be configured to be in communication with a display 116. The computing device 106 may control the transmitter 108 to cause the transmitter 108 to transmit the mechanical waves 112 at the predetermined frequency and signal strength. The computing device 106 may also control the receiver 110 for directing the receiver 110 as to when to listen for the echo 114. As described herein, the computing device 106 may base the frequency of transmission and signal strength of the generated mechanical waves on the type and characteristics of the surrounding medium 104. The computing device 106 may also include a user interface 118 which may be used to select the frequency or a signal strength of the pulse of mechanical waves 112, as examples. The computing device 106 may also be used to create or select predetermined profiles of types of transmitted mechanical waves 112, which may include varying pulse widths, waveforms or continuous acoustic sounds based on the surrounding medium 104, type of sonar system (e.g., a monostatic, a bistatic or a multistatic system), type of acoustic target 102, application or embodiment type. The predetermined profiles may be stored in memory or in a database in communication with the computing device 106. As will be described herein, the computing device 106 may be used to determine the location, depth, position and/or orientation of the acoustic target 102 within the surrounding medium 104.

Figure 2:
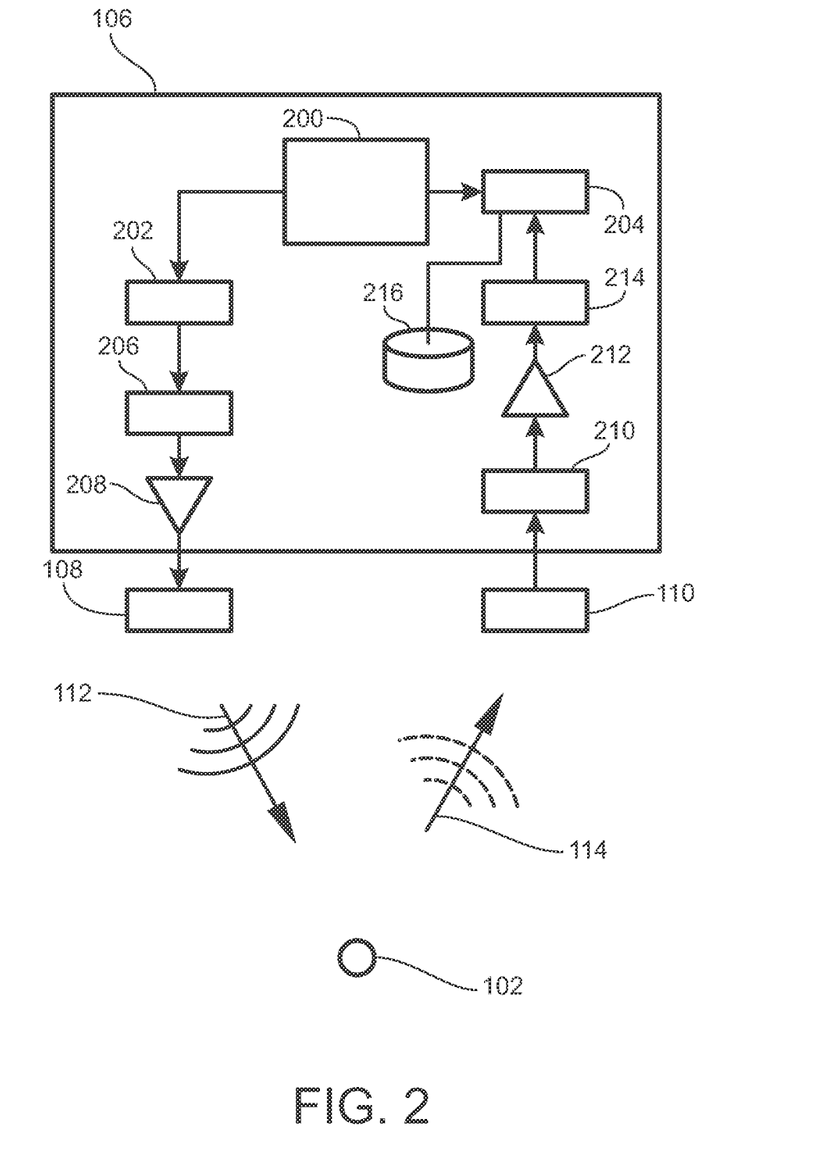
FIG. 2 illustrates a block diagram of another example system for identifying and locating target objects based on echo signature characteristics in accordance with embodiments of the present disclosure.

FIG. 2 illustrates a block diagram of another example system for identifying and locating target objects based on echo signature characteristics in accordance with embodiments of the present disclosure. Referring to FIG. 2, the system may include a computing device 106 including a control unit 200 for controlling a signal generator 202 for signal transmission. The computing device 106 may also include a signal processing unit 204 configured to receive an echo or reflected mechanical wave (e.g., reflected acoustic sound or reflected signals). The control unit 200 may control the signal generator 202 in a transmission mode for transmission of the acoustic sound 112. While in the transmission mode, the control unit 200 may control or instruct the signal generator 202 to provide a signal, either analog or digital, that may be transmitted at various frequencies ranging from 20 kHz to 3 MHz and can be narrowband and/or broadband. If the signal is digital, the signal may be converted to an analog signal by means of a digital-to-analog (D/A) converter 206 and then amplified by means of an amplifier 208 that supplies an amplified analog signal to the transmitter 108, which subsequently transmits the mechanical waves 112.

With continued reference to FIG. 2, the control unit 200 may operate in a receive mode for receiving or detecting mechanical waves, such as an echo wave. In the receive mode, the control unit 200 may cause the receiver 110 to receive the reflected acoustic sound 114 reflected by a target object. The receiver 110 may generate an electrical analog signal representing any reflected acoustic sound 114 received communicating the electrical analog signal to the computing device 106, For example, in the analog signal, the instantaneous amplitude of the analog signal varies continuously with the pressure or intensity of the received reflected acoustic sound(s) 114. The analog signal may then be filtered by a filter 210 to selectively remove frequencies other than the reflected acoustic sound 114, including harmonic, components of interest to improve the detection of the acoustic target 102. The computing device 106 may be configured with any type of filter 210, including a low-pass, a high-pass, a band-pass or other filtering configurations in the signal processing unit 204 of the computing device 106 as appropriate for the expected type of reflected acoustic sound(s) 114 to be received. It is noted the computing device 106 may selectively change the type or characteristic of filtering performed by the filter 210.

With continued reference to FIG. 2, an amplifier 212 may be configured to amplify the electrical analog signal. Amplification of the electrical analog signal may reduce errors in subsequent processing by the signal processing unit 204. The filtered and amplified electrical analog signal may be converted to a digital signal by means of an analog-to-digital (A/D) converter 214. The control unit 200 may control the signal processing unit 204 to record the digital signal in memory or in a storage medium 216. The signal processing unit 204 may perform signal processing and calculations to determine the location of the acoustic target 102 as described herein.

Figures 3A, 3B:
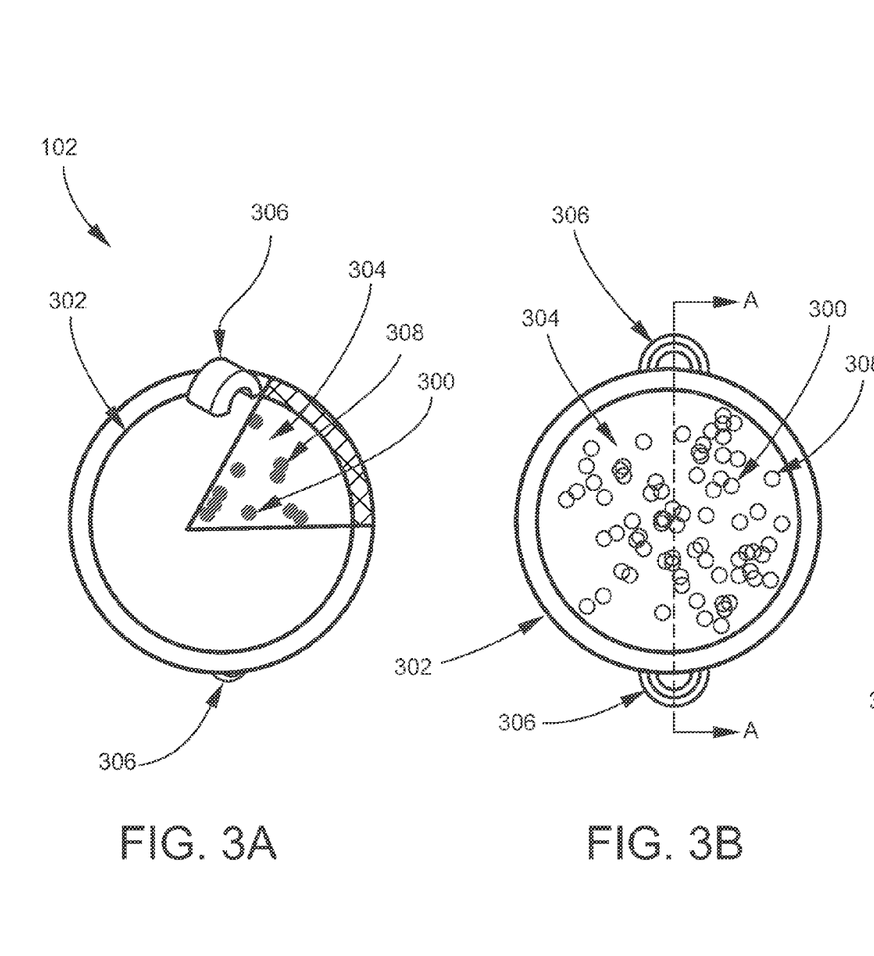
FIGS. 3A-3C illustrate three (3) different, cross-sectional side views of example target objects including a targeting agent in accordance with embodiments of the present disclosure.
Figure 3C:
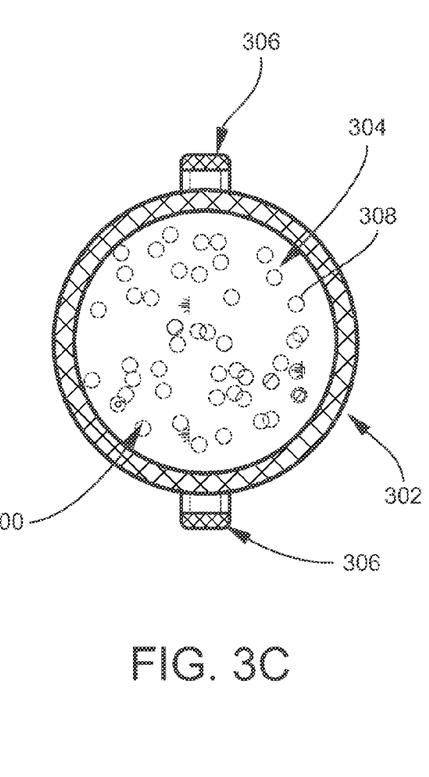

FIGS. 3A-3C illustrate three (3) different, cross-sectional side views of example target objects including a targeting agent 300 in accordance with embodiments of the present disclosure. The target object 102 may include an outer shell 302 and the targeting agent 300 that fills the entirety or a portion of an interior 304 defined by the outer shell 302. The outer shell 302 is a housing for the target object, although it should be understood that the shape and size of the housing may be of any suitable type. The outer shell 302 may be configured to withstand the outside hydrostatic water pressure while maintaining a normalized or predetermined pressure on the interior of the outer shell 302. Maintaining a normalized or predetermined pressure on the interior of the outer shell 302 may be used to reduce changes in response of the targeting agent 300 to changes in pressure that occur with changes in pressure outside the outer shell 302 of the acoustic target 102. With continued reference to FIGS. 3A-3C, the outer shell 302 may allow at least some portion or the entirety of a mechanical wave to penetrate the outer layer 302 and not be immediately reflected, thereby allowing at least a portion of the mechanical wave to pass through the outer shell 302 and be reflected as an echo by the targeting agent 300. In this manner, the echo received at the receiver 110 represents the reflections of the transmitted mechanical wave(s) from the targeting agent 300. The echo of the acoustic sound 112 can be generated or reflected based on an acoustic impedance mismatch encountered by the transmitted mechanical wave(s). An acoustic wave is reflected at a boundary where there is a difference (i.e., a mismatch) in the acoustic impedances of the materials on the 2 sides of the boundary.

At a boundary of 2 materials with acoustic impendances Z1 and Z2, the portion of the acoustic wave intensity that is reflected may be given by the reflected intensity coefficient (R), which can be computed under simplifying assumptions as: $R=((Z2-Z1)/(Z2+Z1))^2$. The portion of the acoustic wave that is transmitted through the boundary is given by the transmission coefficient (T), which can be computed as: $T=1-R$. The greater the acoustic impedance mismatch encountered, typically the greater the signal strength of the reflection. Thus, the outer shell 302 may be configured to have an acoustic impedance equal to or approximately similar to that of the surrounding medium 104 to minimize the echo reflected by the outer shell 302, thereby maximizing the acoustic wave transmitted through the outer shell 302 that will be incident upon the targeting agent 300, as an example.

FIGS. 3A-3C illustrate the outer shell 302 as spherical, however, alternative embodiments may be of any geometry that has an interior that is occupied by the targeting agent 300. Suitable materials for the outer shell 302 may include, but is not limited to, the following: thermoplastic, thermosetting polymers, acrylonitrile butadiene styrene (ABS), high-density polyethylene (HDPE), low-density polyethylene (LDPE), the like, and combinations thereof. The outer shell 302 can be manufactured using techniques such as extrusion, machining, three-dimensional (3D) printing, injection molding, casting, and related methods. The outer shell 302 can include multiple parts that are assembled, formed, or glued together. In another embodiment, the outer shell 302 includes a cylindrical vial with a cap that can be screwed or press-fit on. In this embodiment, the cap can be easily removed and put back on to allow quick and easy replacement of the targeting agent 300. Additionally, the outer shell 302 can also have interior supports or framing, to strengthen the resistance to pressures and forces external to the acoustic target 102. The outer shell 302 may have an attachment mechanism 306 to attach or couple the acoustic target 102 to any object of interest. The attachment mechanism 306 may include a mounting bracket, a clip, a means to tie the acoustic target 102 to an object of interest or any other similar form of attachment.

The targeting agent 300 may be a solution of gas-filled microbubble(s) 308 in a liquid suspension. Microbubbles may also be known as "microbodies," "microspheres," "microglobules," "microcapsules," and "microballoons." Microbubbles can result from the introduction of either an air or gas in divided form or an air or gas body with a material boundary or envelope formed of molecules other than that of the liquid suspenions, such as a polymer membrane wall or the like. Each microbubble 308 may include an outer microbubble boundary and a gas interior. The gas interior may have a high acoustic impedance mismatch with the liquid in which the microbubble is suspended in, such that the acoustic energy of the echo of the wave(s) reflected by the microbubble 308 in the targeting agent 300 is maximized. The composition of the targeting agent 300 may be such that when the transmitted mechanical wave is incident upon the targeting agent 300, the microbubble(s) 308 rapidly compress and expand, causing the microbubble(s) 308 to oscillate at a resonant frequency. The microbubbles 308 may also resonate at harmonic frequencies that are integer multiples of the fundamental resonant frequency. The acoustic energy may be reflected in multiple directions from the microbubble 308 with a frequency representing the fundamental and/or harmonics of the resonant oscillation frequency of the microbubble 308. Once reflected, the echo may subsequently travel back through the outer shell 302 of the target object. The unique acoustic response of the microbubble 308 in the targeting agent 300 comprising the acoustic target 102 may give the acoustic target 102 a unique acoustic signature that can be differentiated from the echoes produced by other sources.

Because other sources do not resonate or resonate very little at the harmonic frequencies, the echo reflected by the target object has an acoustic signature that is unique from acoustic signals produced by other sources. The acoustic signals or echoes produced by other sources may include lake bottoms, aquatic life forms, rock formations or other similar objects that may generate reflected acoustic sound not necessarily attributable to the target object.

Figure 4:
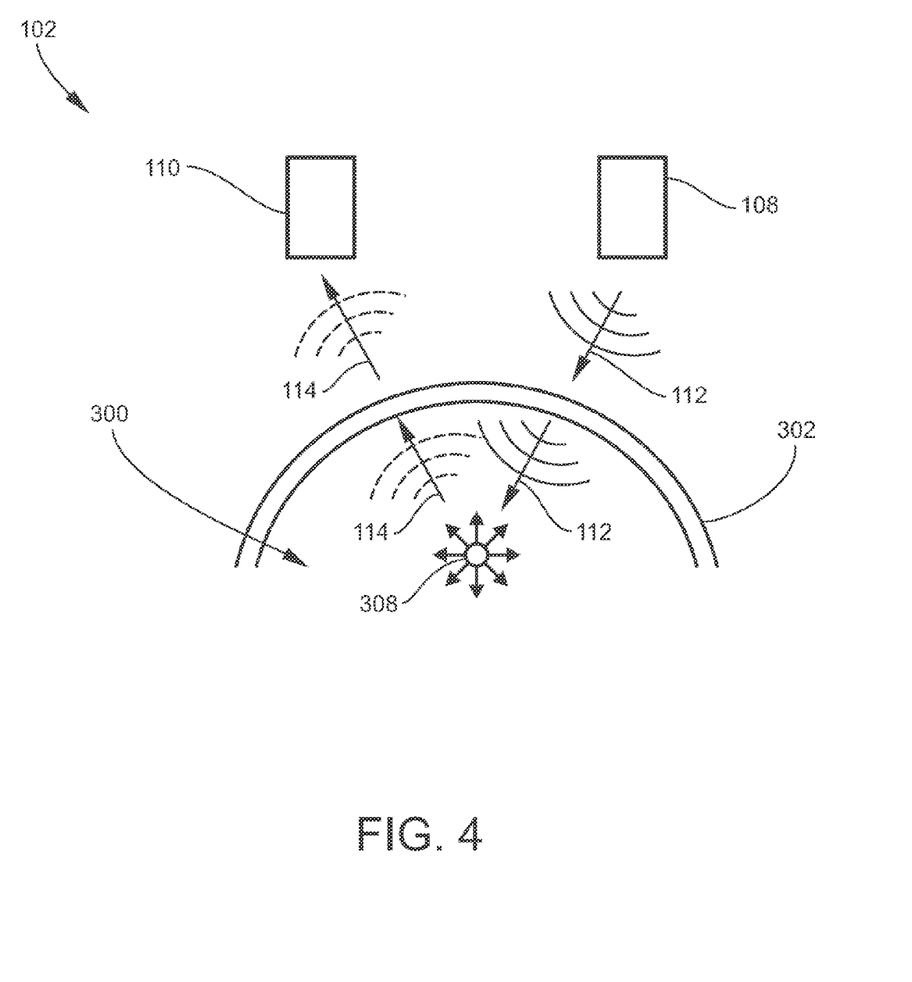
FIG. 4 illustrates a block diagram depicting an example target object when receiving mechanical waves from a transmitter and the resulting reflected echo in accordance with embodiments of the present disclosure.

FIG. 4 illustrates a block diagram depicting an example target object 102 when receiving mechanical waves 112 from a transmitter 108 and the resulting reflected echo 114 in accordance with embodiments of the present disclosure. Referring to FIG. 4, the mechanical waves 112 transmitted by the transmitter 108 falls incident or strikes the outer shell 302 of the target object 102. The mechanical waves 112 may propagate through the outer shell 302 and be incident upon the microbubbles 308 of the targeting agent 300. The microbubbles may oscillate to generate the echo 114 from the transmitted mechanical waves 112. The echo 114 propagates back through the outer shell 302 and continues to propagate through the surrounding medium 104 until it is detected by the receiver 110. It is noted that while a single microbubble 308 is illustrated, the transmitted wave 112 may be incident upon all or a portion of microbubbles 308 contained within the targeting agent 300.

With continued reference to FIG. 4, for optimal reflective performance, the frequency of the transmitted mechanical waves 112 is set equal to the resonant oscillation frequency of the microbubble(s) 308 in the targeting agent 300 contained within the acoustic target 102. The amplitude of the reflected acoustic sound 114 can be maximized based on the how similar the frequency of the transmitted mechanical waves 112 is to the resonant frequency of the targeting agent 300. In this manner, the signal-to-noise of the reflected acoustic sound 114 detected by the receiver 110 may also be maximized, thus improving the ability of the system to detect or recognize the acoustic target 102. The resonant oscillation frequency of the targeting agent 102 may depend upon many parameters, including the diameter, membrane thickness, and material properties of the microbubble(s) 308. Based on the application, the diameter, membrane thickness, and material properties of the microbubble(s) 308 may be adjusted to design an acoustic target 102 with specific resonant frequencies. As an example, micron sized microbubble(s) 308 capable of passing through human capillaries resonate at frequencies ranging from 1-10 MHz. The flexible use of the targeting agent 300 wherein the diameter and material properties can be modified to optimize the acoustic target 102 may be beneficial for many applications. Once the targeting agent 300 is designed, combined or created, an acoustic signature for each acoustic target 102 can be measured at various depths, pressures and distances. The experimentally measured data can be saved in the signal processing unit 204 or computing device 106 and used in pattern matching algorithms performed in the signal processing unit 204 to identify the acoustic signal within the reflected acoustic sounds 114.

The microbubble(s) 308 of the targeting agent 300 of the present disclosure can be prepared by techniques known in the art, such as, for example, by a method described in any one of the following patents: EP 554213, U.S. Pat. Nos. 5,413,774, 5,578,292, EP 744962, EP 682530, U.S. Pat. Nos. 5,556,610, 5,846,518, 6,183,725, EP 474833, U.S. Pat. Nos. 5,271,928, 5,380,519, 5,531,980, 5,567,414, 5,658,551, 5,643,553, 5,911,972, 6,110,443, 6,136,293, EP 619743, U.S. Pat. Nos. 5,445,813, 5,597,549, 5,686,060, 6,187,288, and 5,908,610 incorporated by reference in its entirety herein.

Those skilled in the prior art will appreciate that, in other embodiments, other materials and methods may be utilized to manufacture the microbubbles 308 within the targeting agent 300. In another embodiment, the target object 102 can comprise two or more targeting agents 300 with reflected acoustic sounds with different acoustic signatures. By changing the relative concentrations of different targeting agents 300, different targeting agent 300 mixtures (i.e., cocktails) may be designed to improve the uniqueness of the acoustic signature of the reflected acoustic sound 114. In another embodiment, the computing device 106 may be configured to identify multiple target objects 102, each with a different acoustic signature.

Figures 5A, 5B, 5C:
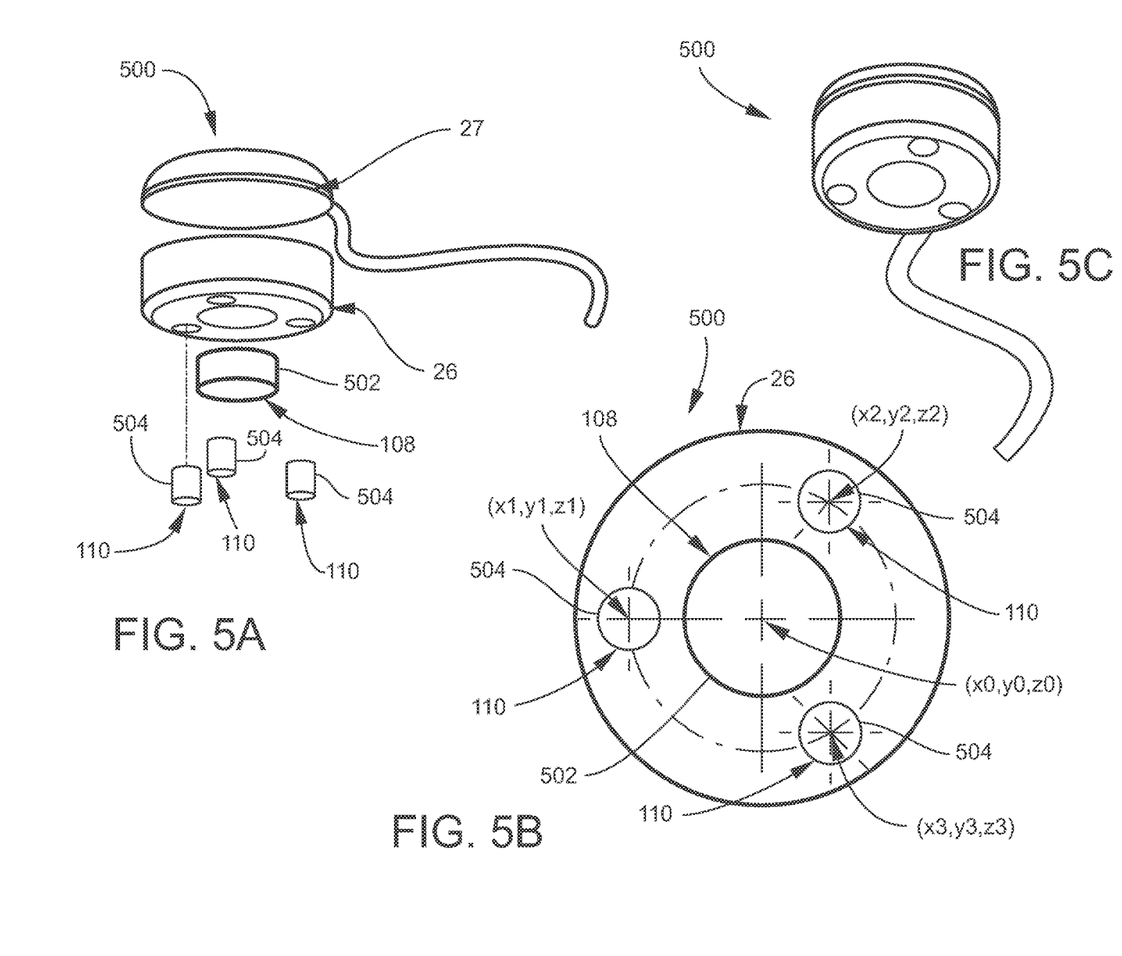
FIGS. 5A-5C illustrate three (3) different views of configurations of a combined acoustic unit, the combined acoustic unit may include the transmitter and the receiver for the transmitting and receiving of acoustic sounds in accordance with embodiments of the present disclosure.

FIGS. 5A-5C illustrate three (3) different views of configurations of a combined acoustic unit 500, the combined acoustic unit 500 may include the transmitter 108 and the receiver 110 for the transmitting and receiving of acoustic sounds 112, 114 in accordance with embodiments of the present disclosure. The transmitter 108 may include one or more transducer elements 502 that are configured to emit the acoustic sound 112. The receiver 110 includes one or more hydrophones 504. The hydrophone(s) 504 can each be a transducer element that is configured to receive acoustic sound 114. The number of hydrophone(s) 504 in the receiver 110 is based on the desired application. For example, at least 3 hydrophones 504 may be required to determine the position of the acoustic target 102 in 3 dimensions, whereas only a single hydrophone 504 is required to determine the range to the acoustic target, wherein determining the range is a single dimension. For redundancy and/or increased accuracy the receiver 110 may contain more than three (3) hydrophones 504, as an example. Additionally, as described herein, multiple combined acoustic units 500 may be used in communication with the computing device 106.

With continued reference to FIGS. 5A-5C, both the transmitter 108 and/or the receiver 110 may comprise an array with at least one transducer element 502, 504. Multiple element type arrays may arrange the transducer elements 502, 504 in one-dimensional (1D) or two-dimensional (2D) arrangements that may be linear or non-linear, including curved, cylindrical, circular, and possibly random, patterns. The transmitter 108 and/or receiver 110 may operate in unfocused (omnidirectional) and/or focused (directional) modes of operation using linear and/or phased array scanning techniques. The focused mode of operation may achieve improved resolution and signal-to-noise by directing (i.e. steering) the transmitted and/or received acoustic sounds 112, 114 at the acoustic target 102. The transmitter 108 and/or receiver 110 may achieve focusing geometrically, by using an acoustic lens or curved array geometry, and/or by electronic phasing of the transmitted and/or received acoustic sounds 112, 114 to and from each element 502, 504 comprising the array. With a 1D array, the acoustic beam can be electronically focused in one dimension, whereas with a 2D array the acoustic beam can be electronically focused in two dimensions. In some embodiments, the transmitter 108 and receiver 110 can be directed towards the acoustic target 102 by mechanically moving the transducer or transducer elements 502, 504. Focusing of the received acoustic sound 114 is typically known as beamforming, which may include electronic phasing of the acoustic sounds received by multiple transducer elements followed by the summation of the delayed signals or acoustic sounds. In other embodiments, other forms of beamforming and/or post-processing of sonar data may be performed for improved resolution and signal to noise including synthetic aperature methods that coherently combine data from multiple transmits.

FIG. 5A is an exploded view of the components of the combined acoustic unit 500. As described above the combined acoustic unit 500 may include the transducer elements 502, 504. The combined acoustic unit 500 may also include a transducer element base 506 and a cable assembly 508. The cable assembly 508 may provide for a means to communicatively couple the combined acoustic unit 500 to the computing device 106. It is noted that the combined acoustic unit 500 may also provide for communicating with the computing device 106 via a wireless means as described herein. The transducer element base 506 and the cable assembly 508 may also be present in other embodiments including the either or both the transmitter 108 and the receiver 110.

FIG. 5B illustrates a schematic coordinate view of the combined acoustic unit 500 wherein the transmitter 108 and receiver 110 are positioned with a known Cartesian position for each of the three (3) hydrophones 504, as an example. In this example, the three (3) Cartesian reference positions of the three (3) hydrophones 504 are described as (x1,y1,z1), (x2,y2,z2), (x3,y3,z3). In other embodiments more or less than three (3) reference positions may be used. The computing device 106 includes the signal processing unit 204 that may be configured to receive and record the amplified digital signal from the hydrophone(s) 504. In this example, the hydrophones 504 together form the receiver 110. The signal processing unit 204 may use digital microprocessors (not shown) and digital acoustic signature recognition technology to determine the arrival time and/or angle of arrival of the reflected acoustic sound 114 reflected by the acoustic target 102 at each of the respective hydrophones 504.

The signal processing unit 204 may calculate the time of arrival and/or angle of arrival for at least one reflected acoustic sound 114 and may use the calculated time of arrival and/or angle of arrival to determine the location of the target object 102. For example, assuming the speed of sound in the surrounding medium 104 is reasonably known, an accurate range from the target object 102 to the hydrophone 504 in the receiver 110 can be calculated based on the time of arrival according to:

$$r = \frac{ct}{2}$$

where;
r=range
c=medium speed of sound
t=time-of-arrival
The length of time-of-arrival, t, is the time required for the transmitted acoustic sound 112 to be transmitted to, then reflected by target object 102 and then received by receiver 110.

To calculate the 3-d position or location of the target object 102 relative to the receiver 110, several methods may be used. A first example of calculating the 3-d position is based on a method of trilateration. A second example of calculating the 3-d position is based on a method of triangulation. A third example of calculating the 3-d position is based on a method of multi-lateration. All these example methods of calculation may be performed by microprocessors in the signal processing unit 204 described herein. In the first non-limiting example, trilateration, the distance (i.e. range) of the target object 102 to each of the at least three (3) hydrophones 504 should be calculated from absolute time of arrival measurements, whereas in the second example, triangulation, the absolute angles of arrival between pairs of at least three (3) hydrophones 504 should be calculated. Unlike trilateration and triangulation, where the absolute time of the acoustic wave 112 emitted by the transmitter 108 must be known, in the third example, multi-lateration, the relative time of arrival difference between at least four (4) different hydrophones 504 should be calculated.

With continued reference to FIG. 5B, as an example of identifying the 3-d position based on the first example method of trilateration, the signal processing unit may be configured to calculate the range. For example, positions of the three (3) hydrophones 504 in the receiver 110 are at known positions. The positions of the three (3) hydrophones 504 are assigned three (3) location coordinate values of (x1,y1,z1), (x2,y2,z2), and (x3,y3,z3), respectively. Based on the three (3) assigned location coordinate values of the hydrophones 504, the 3-d position of the acoustic target 102 location (xt,yt,zt) can be determined by solving the system of equations below:

$$r1 = \sqrt{(xt-x1)^2 + (yt-y1)^2 + (zt-z1)^2}$$

$$r2 = \sqrt{(xt-x2)^2 + (yt-y2)^2 + (zt-z2)^2}$$

$$r3 = \sqrt{(xt-x3)^2 + (yt-y3)^2 + (zt-z3)^2}$$

where;
r1=range (time-of-arrival) to hydrophone at (x1,y1,z1)
r2=range (time-of-arrival) to hydrophone at (x2,y2,z2)
r3=range (time-of-arrival) to hydrophone at (x3,y3,z3)

It will be appreciated by the person skilled in the art that, in other embodiments using any number of transmitters 108, receivers 110, hydrophones 504 and/or transmitter/receiver units may be used. The methods above can be adapted to use alternative time frequency transforms that may offer better time-frequency resolution and may be less computationally demanding.

The reflected acoustic sound 114 from the target object 102 may have a unique acoustic signature with frequency components unlike those from other sources. The echoes 114 from the target object 102 embedded with acoustic signals from other sources and noise can be identified via frequency analysis performed by the signal processing unit 204. The frequency analysis may be performed by the signal processing unit 204 by searching for the expected resonant frequency response components of the unique acoustic signature reflected by the target object 102. The signal processing unit 204 will search for the expected resonant frequency response components embedded within the received acoustic sound 114. In an embodiment, digital acoustic signature recognition techniques may perform a time-frequency analysis of the digitized echo(es) 114. For example, the digital acoustic signature recognition techniques implemented may use overlapping Fast Fourier Transforms (FFTs), Wigner-Ville Distribution, Gabor transform, wavelet analysis or other suitable techniques to find the signal signatures corresponding to the echo(es) 114 of the acoustic target 102. These digital acoustic signature recognition techniques may also be used to determine its time of arrival. Other techniques may be used, such as matched filtering, cross correlation, and neural networking to compare the digitized reflected acoustic sound signature of the received echo(es) 114 with experimentally measured and/or simulated signal signature(s) of a known response of the acoustic target 102.

Figure 6:
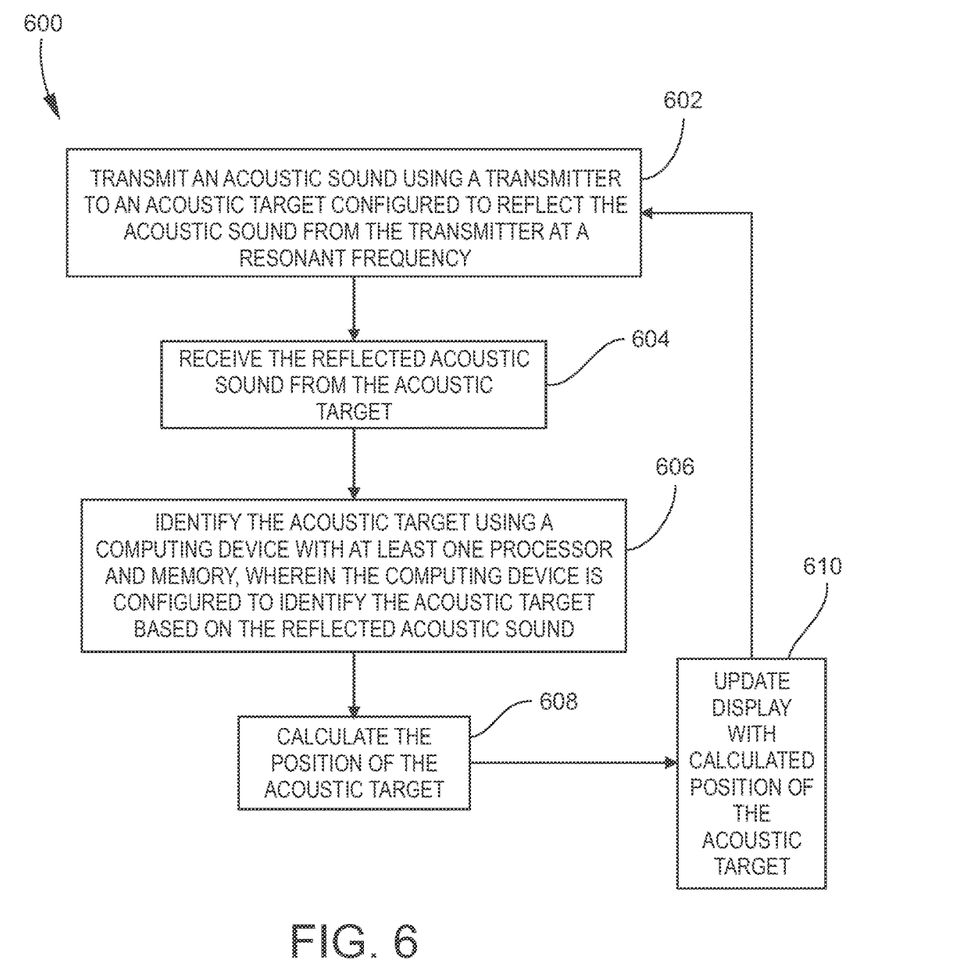
FIG. 6 is a flowchart showing an example method for locating an acoustic target in accordance with embodiments of the present disclosure.

FIG. 6 is a flowchart showing an example method 600 for locating a target object in accordance with embodiments of the present disclosure. Referring to FIG. 6, the method 600 may include transmitting 602 mechanical waves to a target object configured to reflect an echo at a predetermined signature characteristic. The echo may also have a unique acoustic sound signature as described herein, wherein the unique acoustic sound signature may be digitized and processed by a signal processing unit so as to compare the signature of the echo to a database of signatures of stored acoustic sounds.

The method of FIG. 6 may also include receiving 604 the echo from the target object. The method 600 may include receiving 604 the reflected acoustic sound 114 using the transmitter 108 and the receiver 110 described herein. The method 600 may also include identifying 606 the acoustic target 102 using the computing device 106 with at least one processor and memory, wherein the computing device 106 is configured to identify the acoustic target 102 based on the reflected acoustic sound 114. Identifying 606 the acoustic target based on the reflected acoustic sound 114 may use the computing device 106 to compare the acoustic signature of the reflected acoustic sound 114 with a reference acoustic signature which may be stored in memory or in a database. The method 600 may also include calculating 608 the position of the target object 102. Using a variety of possible methods described herein, the computing device 106 and/or the signal processing unit 204 may determine the location or position of the target object 102. The method 600 may also update 610 the display 116 and/or user interface 118 with the calculated position of the target object 102. The display 116 and/or the user interface 118 may be configured to show various indicators or markers of varying colors or symbols unique to each located target object 102. The display 116 may be a wireless or wired network device including remote displays, phones, tablets and/or computers.

Figure 7:
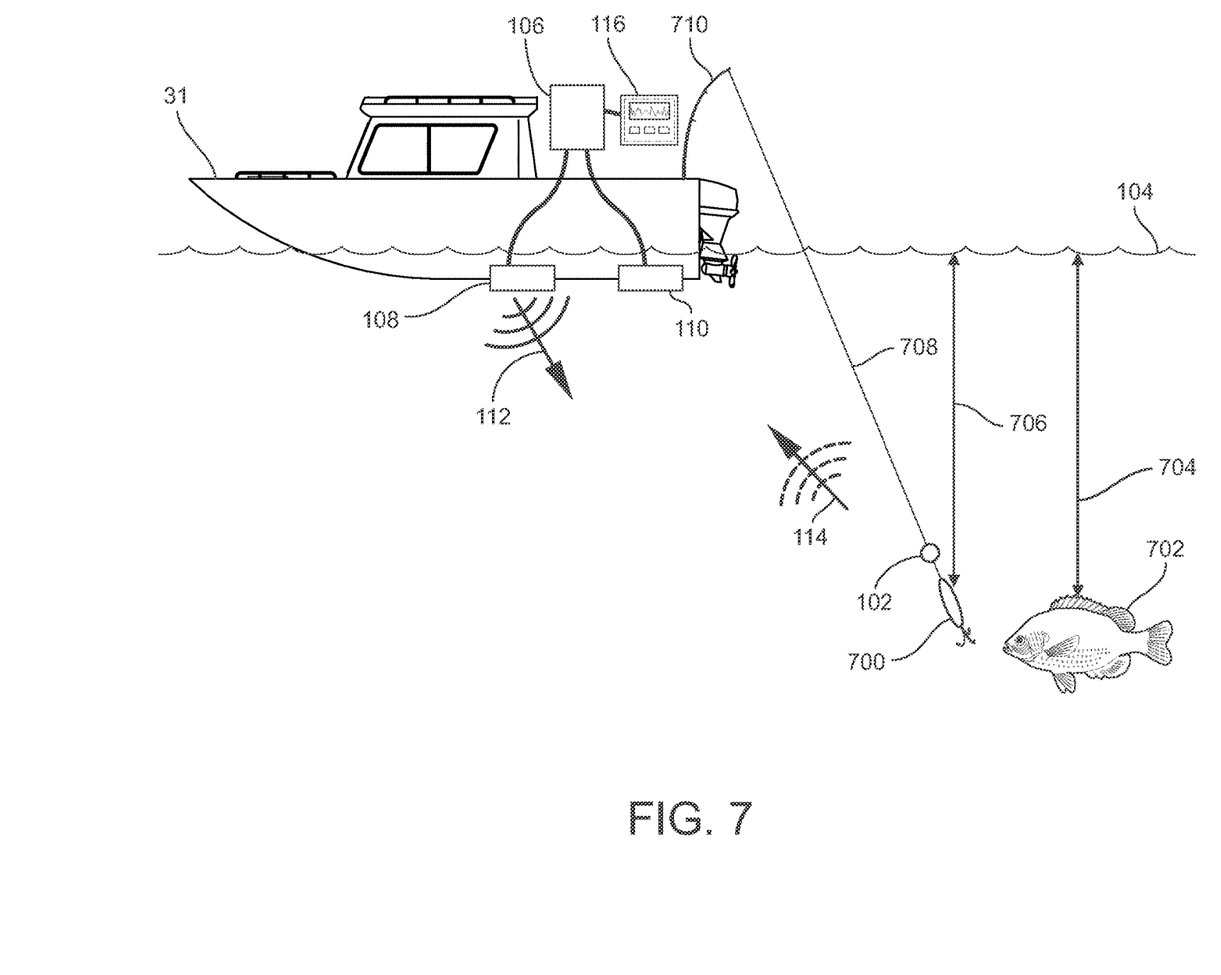
FIG. 7 illustrates a block diagram of another example system for locating and identifying a target object in accordance with embodiments of the present disclosure.

FIG. 7 illustrates a block diagram of another example system for locating and identifying a target object 102 in accordance with embodiments of the present disclosure. Systems and methods disclosed herein may be used in a variety of applications. A non-limiting example may be to indicate the depth of a fishing lure 700 (e.g., hooks, bait, and etc.) used by anglers (e.g., recreational fishermen). In this example, the fishing lure 700 may be the acoustic target 102 or the fishing lure 700 may be a known distance from the acoustic target 102, such as a relatively short or known distance from the fishing lure 700. It is well known that fish 702 prefer specific depths 704 in the water depending upon species and time of year. Fishing at the proper depth 706 is of critical importance and can often mean the difference between a successful angler and an unsuccessful angler. While typical fish finders may be used to determine the specific depth 704 and location of the fish 702, a reliable method to determine the depth 706 and location of the fishing lure 700 does not exist. Therefore, even if the fish depth 704 and location is known, it remains a significant challenge for an angler to position the fishing lure 700 in the vicinity of the fish 702, thus in many instances an angler may be fishing where there are no fish.

With continued reference to FIG. 7, devices exist that measure the length of a fishing line 708 let out of a fishing reel 710, which can provide estimates of the fishing lure 700 depth if the fishing line 708 is perfectly vertical in the water. However, dependent upon the direction and speed of the water, wind, and possibly boat drift when trolling, there exist many conditions in which the fishing lure 700 depth may be significantly different from the length of the fishing lire 708. The sonar system 100 described herein may accurately locate and position the target object 102 independent of the length of the fishing line 708 without electronics or power sources located at the location of the target object 102.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

What is claimed is:

1. A target object comprising:
    a housing defining an interior, configured to insulate the interior from pressure changes external to the housing, and configured with a first acoustic impedance;
    an agent positioned within the interior and configured with a second acoustic impedance to generate an echo in response to receipt of the at least one mechanical wave, wherein the agent comprises a liquid solution; and
    wherein the first acoustic impedance and the second acoustic impedance are chosen relative to an acoustic impedance of a medium external to the housing such that an intensity of an echo reflected by the agent is larger than an intensity of an echo reflected by the housing.

2. A target object comprising:
    a housing defining an interior, configured to insulate the interior from pressure changes external to the housing, and configured with a first acoustic impedance;
    an agent positioned within the interior and configured with a second acoustic impedance to generate an echo in response to receipt of the at least one mechanical wave, wherein the agent comprises a solution of gas-filled microbubbles in a liquid suspension; and
    wherein the first acoustic impedance and the second acoustic impedance are chosen relative to an acoustic impedance of a medium external to the housing such that an intensity of an echo reflected by the agent is larger than an intensity of an echo reflected by the housing.

3. The target object of one of claims 1 and 2, wherein the housing comprises an outer shell material selected from the group consisting of: thermoplastic, thermosetting polymers, acrylonitrile butadiene styrene, high-density polyethylene, and low-density polyethylene.

4. The target object of one of claims 1 and 2, wherein the housing further comprises an attachment mechanism, wherein the attachment mechanism is configured for attaching the housing to an object.

* * * * *